United States Patent
Ko (10) Patent No.: US 8,696,536 B2
(45) Date of Patent: Apr. 15, 2014

(54) APPARATUS FOR FOLDING A DRIVER AIRBAG CUSHION AND METHOD FOR FOLDING THE DRIVER AIRBAG CUSHION

(75) Inventor: Seok Hoon Ko, Yongin-si (KR)

(73) Assignee: Hyundai Mobis Co., Ltd., Yongin-si, Gyeonggi-do (KR)

( * ) Notice: Subject to any disclaimer, the term of this patent is extended or adjusted under 35 U.S.C. 154(b) by 159 days.

(21) Appl. No.: 13/234,681

(22) Filed: Sep. 16, 2011

(65) Prior Publication Data

US 2013/0017942 A1 Jan. 17, 2013

(30) Foreign Application Priority Data

Jul. 15, 2011 (KR) ........................ 10-2011-0070349

(51) Int. Cl.
*B31B 1/26* (2006.01)

(52) U.S. Cl.
USPC ............................. 493/405; 493/449; 493/455

(58) Field of Classification Search
USPC .................. 493/405, 408, 449, 455, 457, 458
See application file for complete search history.

(56) References Cited

U.S. PATENT DOCUMENTS

| 5,791,682 A * | 8/1998 | Hiramitsu et al. ......... 280/728.2 |
| 5,984,852 A * | 11/1999 | Heudorfer et al. ............ 493/457 |
| 6,115,998 A * | 9/2000 | Reh et al. ........................ 53/429 |
| 6,152,867 A * | 11/2000 | Heudorfer et al. ............ 493/451 |
| 6,248,052 B1 * | 6/2001 | Kleeberger et al. ........... 493/374 |
| 6,588,179 B2 * | 7/2003 | Haley et al. ..................... 53/429 |
| 6,779,813 B2 * | 8/2004 | Lincoln ..................... 280/743.1 |
| 2005/0209080 A1* | 9/2005 | Nishijima et al. ............ 493/449 |
| 2007/0096448 A1* | 5/2007 | Yokoyama et al. ........ 280/743.1 |

* cited by examiner

*Primary Examiner* — Hemant M Desai
(74) *Attorney, Agent, or Firm* — Sherr & Jiang, PLLC (57) ABSTRACT

An apparatus for folding a driver airbag cushion, including: a first plate where an airbag cushion is placed to be folded; a fixing jig that fixes the center portion of the airbag cushion on the first plate; a second plate that covers the fixed airbag cushion; a plurality of first press jigs that is inserted between the first plate and the second plate and circumferentially divides the airbag cushion into several sections by pressing inward the edge of the airbag cushion; and a plurality of second press jigs that is inserted between the first plate and the second plate and compresses the airbag cushion, which has been divided into several sections by the first press jigs, by pressing inward the edge of the airbag cushion.

8 Claims, 10 Drawing Sheets

APPARATUS FOR FOLDING A DRIVER AIRBAG CUSHION AND METHOD FOR FOLDING THE DRIVER AIRBAG CUSHION

CROSS-REFERENCE TO RELATED APPLICATIONS

The present application claims priority to Korean Patent Application Number 10-2011-0070349 filed Jul. 15, 2011, the entire contents of which application is incorporated herein for all purposes by this reference.

TECHNICAL FIELD

The present invention relates to an apparatus for folding a driver airbag cushion and a method of folding a driver airbag cushion, and more particularly, to an apparatus for folding a driver airbag cushion that makes it possible to receive an airbag cushion in an internal space having various shapes of a mounting plate without an empty space, and a method of folding the driver airbag cushion.

BACKGROUND

In general, vehicles are equipped with airbag systems, safety devices, which protect passengers, using an airbag cushion inflated by inflow gas from an inflator in a car accident.

Those airbag apparatuses are installed at desired positions in the vehicles, if necessary, and there have been proposed a driver airbag apparatus mounted in the steering wheel to protect the driver in the driver seat, a passenger airbag apparatus mounted at the upper portion in the glove box to protect a passenger in the passenger seat, and a curtain airbag apparatus mounted on the roof rail to protect the passenger's side.

In those airbag apparatuses, the driver airbag apparatus includes an inflator that generates a gas and an airbag cushion that is connected with the inflator and protects the driver while inflating with the gas.

The airbag cushion is provided with a retainer having an inflator hole where the inflator is inserted, such that the airbag cushion and the inflator are connected by inserting the head of the inflator into the inflator hole and fastening the inflator with the retainer with bolts.

The driver airbag cushion is folded and received in the mounting plate disposed in the steering wheel and protects the driver while being unfolded and inflated a gas generated and flowing inside from the inflator.

However, the mounting plate is provided with various shapes in accordance with the kinds of steering wheels and the internal space of the mounting plate that receives the airbag cushion is also provide with various shapes.

Therefore, if the driver airbag cushion is folded in one shape, when the airbag cushion is folded and received in the internal space having various shapes of the mounting plate, there are empty spaces between the received airbag cushion and the mounting plate, such that the airbag cushion fails to be correctly unfolded, which has an adverse effect on the unfolding performance of the airbag cushion.

SUMMARY

The present invention has been made in an effort to provide an apparatus for folding a driver airbag cushion that makes it possible to receive an airbag cushion in an internal space having various shapes of a mounting plate without an empty space, and a method of folding the driver airbag cushion.

The objects of the present invention are not limited to the object described above, and the other objects not stated in the above will be clearly understood by those skilled in the art from the following description.

An exemplary embodiment of the present invention provides an apparatus for folding a driver airbag cushion, including: a first plate where an airbag cushion is placed to be folded; a fixing jig that fixes the center portion of the airbag cushion on the first plate; a second plate that covers the fixed airbag cushion; a plurality of first press jigs that is inserted in between the first plate and the second plate and circumferentially divides the airbag cushion into several sections by pressing inward the edge of the airbag cushion; and a plurality of second press jigs that is inserted in between the first plate and the second plate and compresses the airbag cushion, which has been divided into several sections by the first press jigs, by pressing inward the edge of the airbag cushion.

Another exemplary embodiment of the present invention provides a method for folding a driver airbag cushion, including: placing an airbag cushion on a first plate and fixing the center portion of the airbag cushion; covering the fixed airbag cushion with a second plate; inserting a plurality of first press jigs into between the first plate and the second plate and circumferentially dividing the airbag cushion into several sections by pressing inward the edge of the airbag cushion; and inserting a plurality of second press jigs into between the first plate and the second plate and compressing the airbag cushion, which has been divided into several sections by the first press jigs, by pressing inward the edge of the airbag cushion.

The details of other embodiments are included in the detailed specification and the drawings.

In the airbag cushion that has been folded by the apparatus for folding a driver airbag cushion and a method of folding a driver airbag cushion according to an exemplary embodiment of the present invention, since the edge of the airbag cushion is pressed inward by the first press jigs such that the airbag cushion is circumferentially divided into several sections, and then the edge of the airbag cushion that has been divided into several sections by the first press jigs is pressed inward by the second press jigs such that the airbag cushion is compressed by the second press jigs, the airbag cushion is folded in the shape corresponding to the internal space of the mounting plate, such that the airbag cushion can be received in the mounting plate without an empty space.

Further, since the airbag cushion that has been compressed and completely folded by the second press jigs is pushed down into the mounting plate by the pusher, the folding process and receiving process of the airbag cushion are integrated, thereby simplifying the entire process.

The advantages of the present invention are not limited to the advantages described above, and the other advantages not stated in the above will be clearly understood by those skilled in the art from the following description.

DETAILED DESCRIPTION

Advantages and features of the present invention and methods for achieving them will be made clear from exemplary embodiments described below in detail with reference to the accompanying drawings. However, the present invention is not limited to exemplary embodiments described herein and will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals designate like components throughout the specification.

An apparatus and a method for folding a driver airbag cushion according to exemplary embodiments of the present invention are described hereafter with reference to the accompanying drawings.

Figure 1:
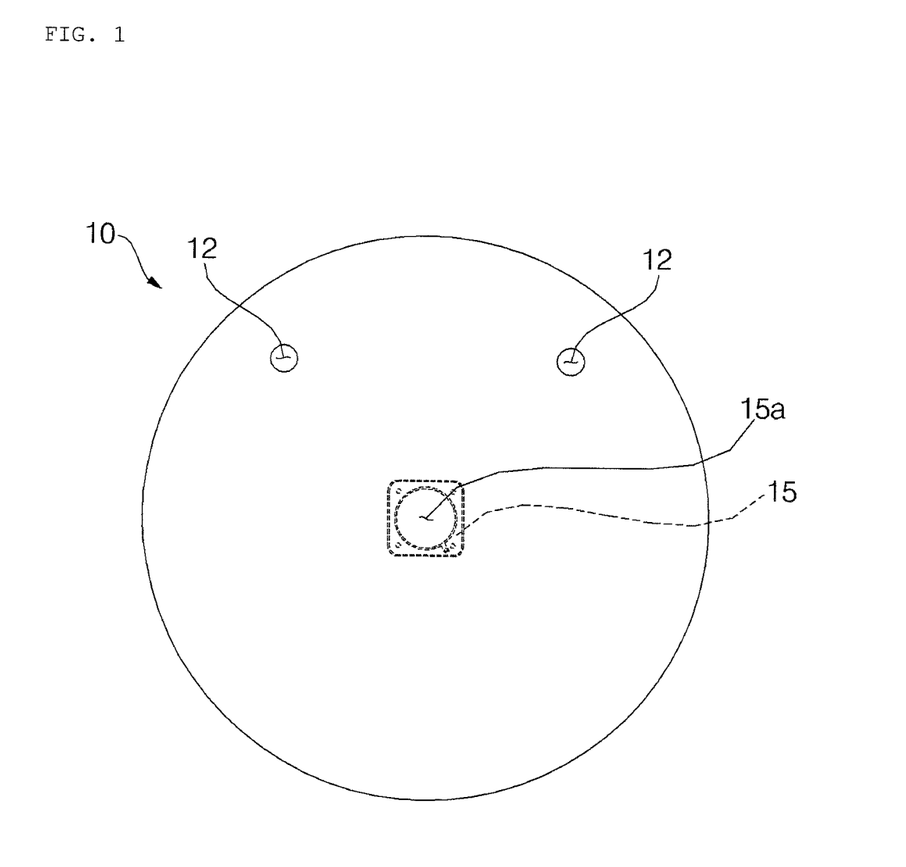
FIG. 1 is a rear view showing a driver airbag cushion that is folded by an apparatus for folding a driver airbag cushion according to an exemplary embodiment of the present invention.

FIG. 1 is a rear view showing a driver airbag cushion that is folded by an apparatus for folding a driver airbag cushion according to an exemplary embodiment of the present invention.

Referring to FIG. 1, a driver airbag cushion 10 that is folded by an apparatus for folding a driver airbag cushion according to the exemplary embodiment of the present invention is formed in a circle. A retainer 15 is inserted in the center portion of the airbag cushion 10 and coupled to the rear side of the airbag cushion 10. The retainer 15 has an inflator hole 15a at the center. The head of an inflator (not shown) which generates a gas is inserted in the inflator hole 15a and then coupled to the retainer 15, such that the inflator is connected to the airbag cushion 10 and supplied a gas into the airbag cushion 10 in an accident. A vent hole 12 through which the gas generated from the inflator is discharged is formed through the rear side of the airbag cushion 10. The airbag cushion 10 inflates in a predetermined size when the gas generated from the inflator flows therein and then discharges the gas through the vent hole 12, thus being able to maintain an appropriate pressure that can protect the driver.

Figure 2:
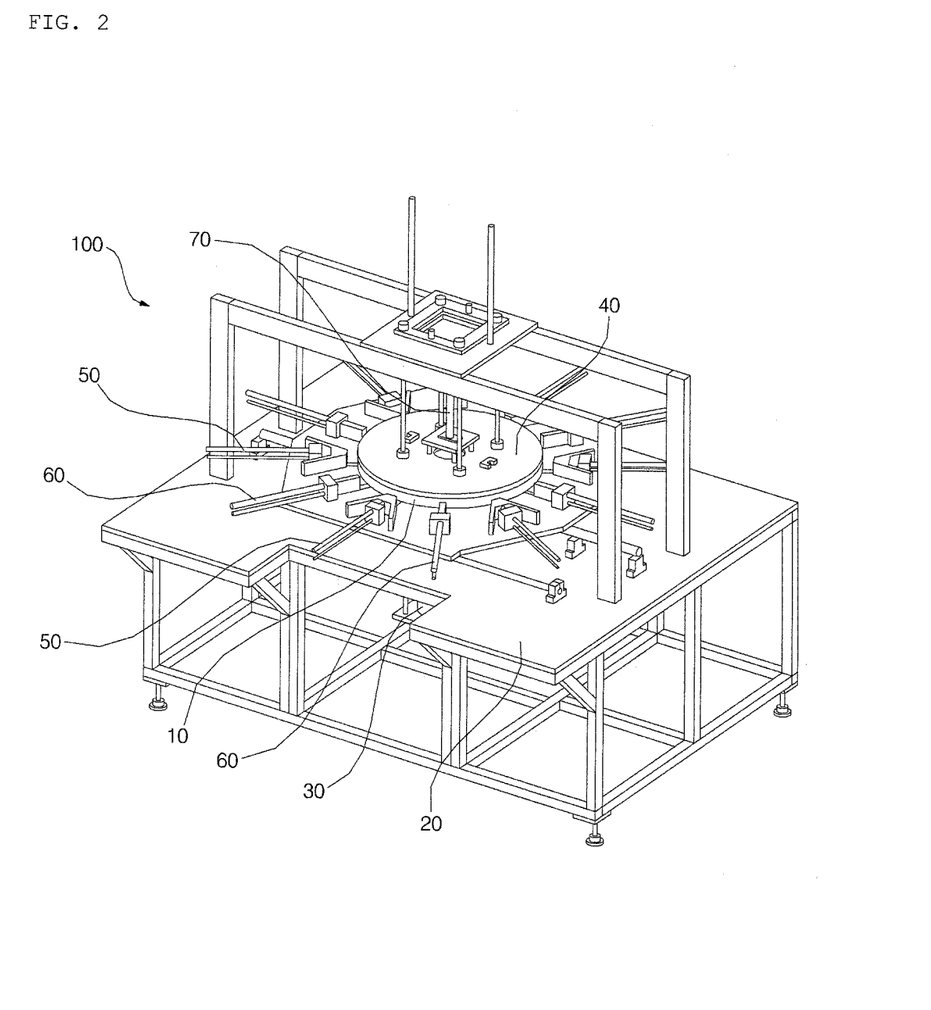
FIG. 2 is a perspective view showing an apparatus for folding a driver airbag cushion according to an exemplary embodiment of the present invention.
Figure 3:
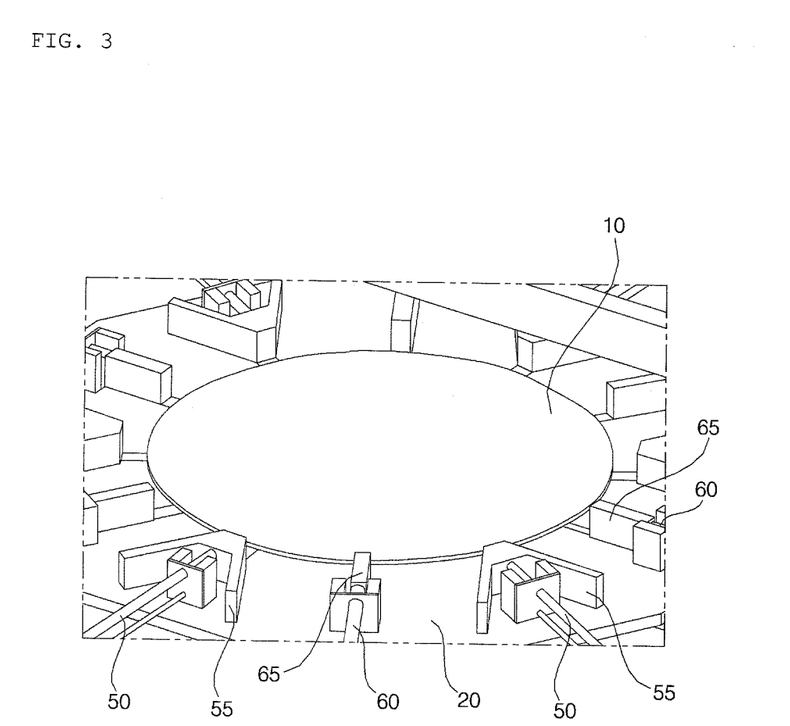
FIG. 3 is a perspective view showing when an airbag cushion is placed on a first plate shown in FIG. 2.
Figure 4:
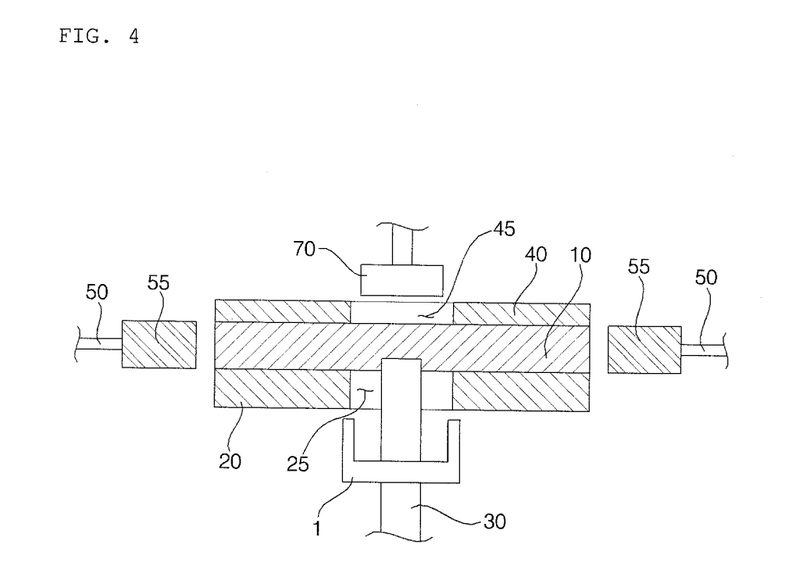
FIG. 4 is a side cross-sectional view showing the apparatus for folding a driver airbag cushion according to an exemplary embodiment of the present invention.

FIG. 2 is a perspective view showing an apparatus for folding a driver airbag cushion according to an exemplary embodiment of the present invention, FIG. 3 is a perspective view showing when an airbag cushion is placed on a first plate shown in FIG. 2, and FIG. 4 is a side cross-sectional view showing the apparatus for folding a driver airbag cushion according to an exemplary embodiment of the present invention.

Referring to FIGS. 2 to 4, an apparatus 100 for folding a driver airbag cushion according to the exemplary embodiment of the present invention includes: a first plate 20 where the airbag cushion 10 is placed to be folded; a fixing jig 30 that fixes the center portion of the airbag cushion 10 placed on the first plate 20; a second plate 40 that covers the fixed airbag cushion 10; a plurality of first press jigs 50 that is inserted between the first plate 20 and the second plate 40 and circumferentially divides the airbag cushion 10 into several sections by pressing inward the edge of the airbag cushion 10; and a plurality of second press jigs 60 that is inserted between the first plate 20 and the second plate 40 and compresses the airbag cushion 10 by pressing inward the edge of the airbag cushion 10 that has been divided into several sections by the first press jigs 50. The apparatus further includes a pusher 70 that pushes the airbag cushion 10 that has been compressed and folded by the second pressure jig 60.

The first plate 20 is formed in a rectangle with an area that is sufficient for a fixing jig 30, the second plate 40, the first press jigs 50, and the second pressure jigs 60.

A fixing jig hole 25 through which the fixing jig 30 passes is formed through the first plate 20. The rear side where the retainer 15 is disposed, in the airbag cushion 10, is placed above the first plate 20. That is, the airbag cushion 10 is arranged such that the inflator hole 15a of the retainer 15 communicates with the fixing jig hole 25.

The fixing jig 30 is disposed under the first plate 20 to be movable up/down and fixes the airbag cushion 10 through the fixing jig hole 25 and the inflator hole 15a of the retainer 15. The fixing jig 30 is connected with a cylinder assembly that is pneumatically or hydraulically operated, and can move up/down.

The second plate 40 is disposed above the first plate 20 to be movable up/down. The second plate 40 is also connected with a cylinder assembly that is pneumatically or hydraulically operated, and can move up/down.

The second plate 40 is formed in a circle that is sized to be able to cover the airbag cushion 10 on the first plate 20. Covering the airbag cushion 10 on the first plate 20 with the second plate 40 implies not that the second plate completely covers the airbag cushion 10, but that the second plate is spaced above from the first plate 20 such that the first press jigs 50 and the second press jigs 60 can be inserted in between the first plate 20 and the second plate 40 and the second plate 40 covers the airbag cushion 10 such that the airbag cushion 10 does not swell up when being pressed by the first press jigs 50 and the second press jigs 60.

A pusher hole 45 through which the pusher 70 passes to push the airbag cushion 10 that has been folded is formed at the center portion of the second plate 40.

The pusher 70 is disposed above the second plate 40 to be movable up/down. The pusher 70 is also connected with a cylinder assembly that is pneumatically or hydraulically operated, and can move up/down. The pusher 70 pushes the airbag cushion 10 through the pusher hole 45 while moving down, when the airbag cushion 10 has been folded by the first press jigs 50 and the second press jigs 60. Therefore, the airbag cushion 10 that has been folded can be pushed down out of the fixing jig hole 25 of the first plate 20 and received in a mounting plate 1.

The mounting plate 1 is disposed at the center portion of a steering wheel, with the airbag cushion 10 received therein, and may be formed in various shapes, depending on the kinds of steering wheels, such as a circle or a triangle.

The mounting plate 1 is disposed under the first plate 20 to receive the airbag cushion 10 when the airbag cushion 10 is pushed down through the fixing jig hole 25 by the pusher 70, such that the mounting plate 1 can receive the airbag cushion 10 that is pushed down through the fixing jig hole 25 after being compressed and folded by the second press jigs 60.

As described above, since the airbag cushion 10 that has been folded is directly received in the mounting plate 1 by the pusher 70, it is possible to integrate the folding process and the receiving process of the airbag cushion 10. That is, in the related art, the airbag cushion 10 is folded in the folding process and sealed with a cushion cover such that the airbag cushion 10 is not unfolded and conveyed to the receiving process, and then the airbag cushion 10 sealed with the cushion cover is inserted and received with the cushion cover in the mounting plate 1 in the receiving process. However, since the airbag cushion 10 that has been folded by the apparatus for folding a driver airbag cushion according to the exemplary embodiment of the present invention is directly received in the mounting plate 1, the folding process and the receiving process of the airbag cushion 10 are integrated, thereby simplifying the entire process.

The first press jigs 50 and the second press jigs 60 are alternately disposed around the airbag cushion 10 above the first plate 20 and can press the edge of the airbag cushion 10. The first press jigs 50 and the second press jigs 60 are implemented by pneumatic or hydraulic cylinder assemblies and can press the edge of the airbag cushion 10 inward while reciprocating above the first plate 20. In the exemplary embodiment, six first press jigs 50 are provided at regular intervals around the airbag cushion 10 and six second press jigs 60 are also provided at regular intervals around the airbag cushion 10.

A first blade 55 is disposed at the end of the first press jig 50 which presses the edge of the airbag cushion 10 and a second blade is disposed at the end of the second press jig 60 which presses the edge of the airbag cushion 10.

The first blade 55 and the second blade 65 are arranged at a height where they can be inserted between the first plate 20 and the second plate 40.

In the first blade 55, the front end has a cross-sectional area that can come in surface contact with the edge of the airbag cushion 10 and the rear end gradually opens and of which the side has a cross-sectional area that can come in surface contact with the airbag cushion 10, in order to circumferentially divide the airbag cushion 10 in several sections.

In the second blade 65, the front end has a cross-sectional area that can come in surface contact with the edge of the airbag cushion 10 in order to compress the airbag cushion 10 divided in to several sections by the first blade 55. The second blade 65 is a hexahedron with a rectangular cross-section.

As described above, since the first blades 55 and the second blades 65 come in surface contact with the edge of the airbag cushion 10, when the airbag cushion 10 has been compressed and folded by the first blades 55 and the second blades 65, the edge of the first airbag cushion 10 forms a surface, such that the folded shape of the airbag cushion 10 can be maintained.

The first press jigs 50 and the second press jigs 60 will be described again with reference to FIGS. 6 to 8.

Figure 5:
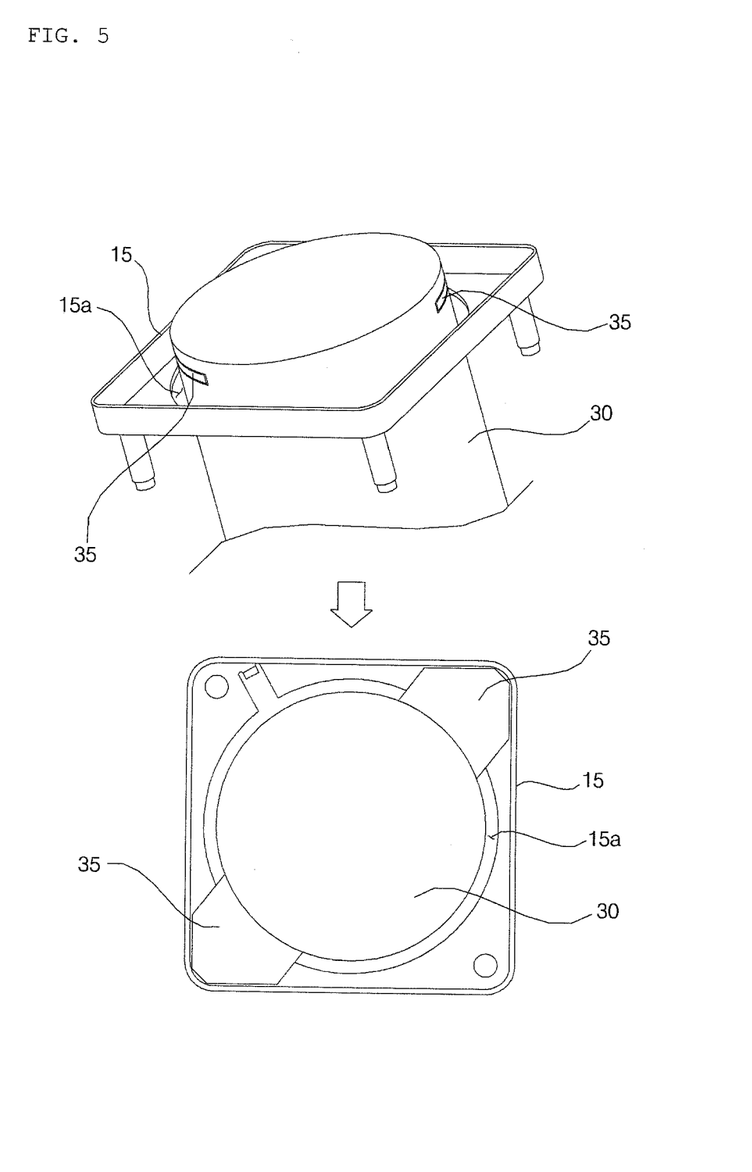
FIG. 5 is view showing when a fixing jig shown in FIG. 4 is inserted in an inflator hole and fixes a retainer.

FIG. 5 is view showing when a fixing jig shown in FIG. 4 is inserted in an inflator hole and fixes a retainer.

Referring to FIG. 5, the retainer 15 in the airbag cushion 10 is formed in a rectangle and the inflator hole 15a is formed at the center portion. Fixing pins 35 that protrude in the radial direction of the inflator hole 15a and fix the retainer 15 are formed on the fixing jig 30 to fix the airbag cushion 10 after the fixing jig 30 is inserted through the inflator hole 15a.

The fixing pins 35 protruding from the fixing jig 30 comes in close contact with corners of the retainer 15 such that the retainer 15 cannot move forward/backward and left/right and cannot rotate. As the retainer 15 is fixed, as described above, the center portion of the airbag cushion 10 on the first plate 20 is fixed without moving forward/backward and left/right and rotating.

Figure 6:
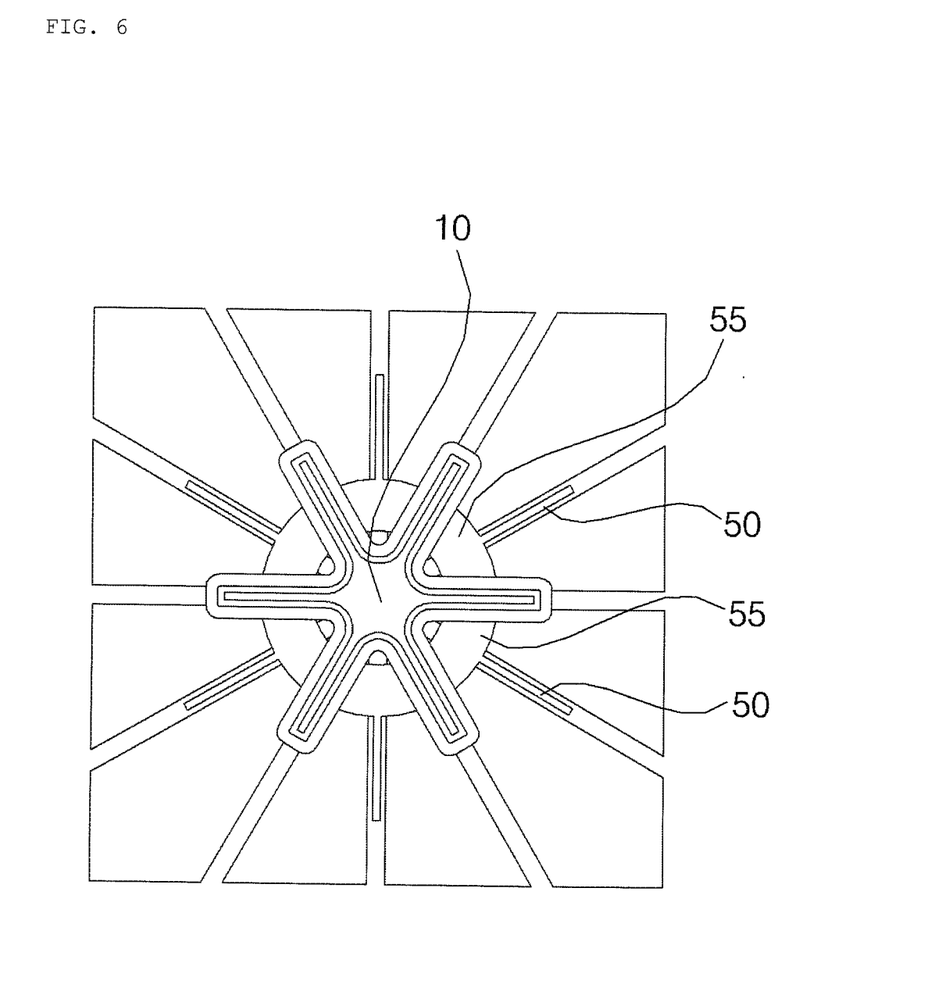
FIG. 6 is a plan view showing when an airbag cushion is pressed and divided into several sections by a first press jig of the apparatus for folding a driver airbag cushion according to an exemplary embodiment of the present invention.

FIG. 6 is a plan view showing when an airbag cushion is pressed and divided into several sections by a first press jig of the apparatus for folding a driver airbag cushion according to an exemplary embodiment of the present invention.

Referring to FIG. 6, when the second plate 40 covers the airbag cushion 10 on the first plate 20, the first press jigs 50 operate first and the first blades 55 are inserted into between the first plate 20 and the second plate 40, such that the first blades 55 divide the airbag cushion 10 circumferentially into several sections by pressing inward the edge of the airbag cushion 10. The airbag cushion 10 is circumferentially divided into several sections, entirely in a radial shape by the first blades 55.

Figure 7:
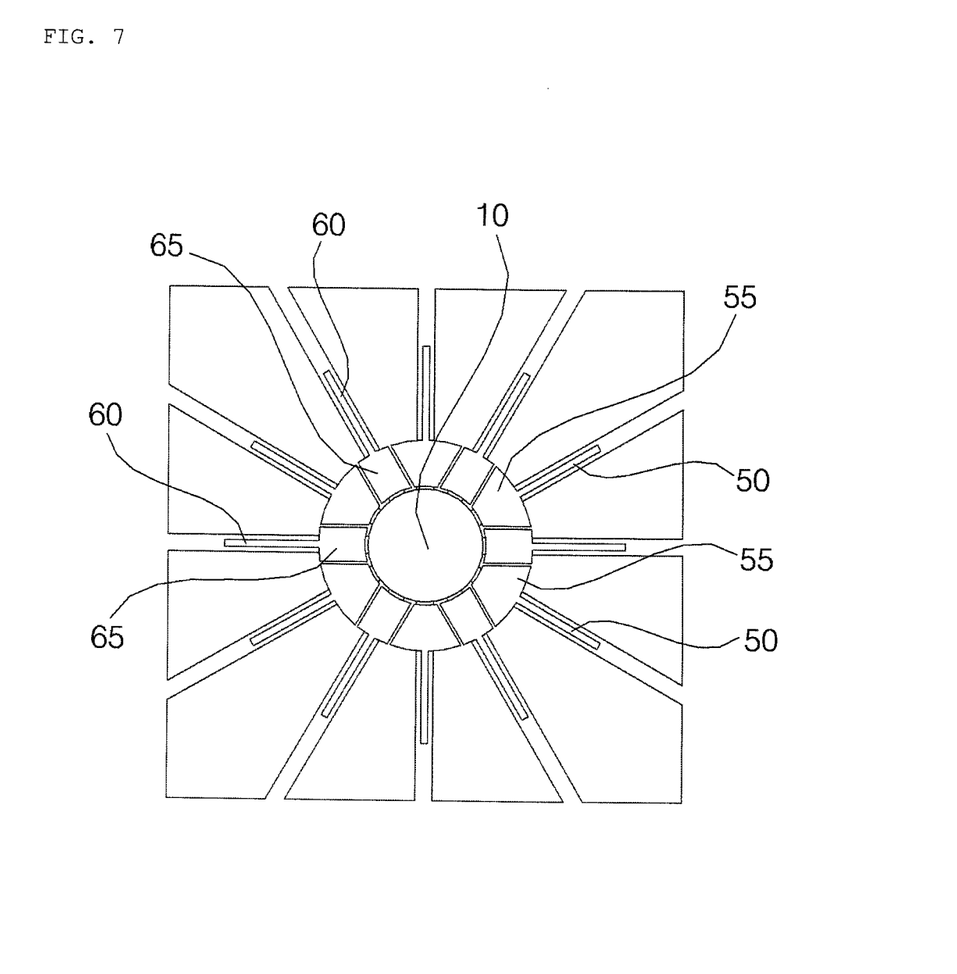
FIG. 7 is a plan view showing when the airbag cushion shown in FIG. 6 is pressed and compressed by a second press jig of the apparatus for folding a driver airbag cushion according to an exemplary embodiment of the present invention.
Figure 8:
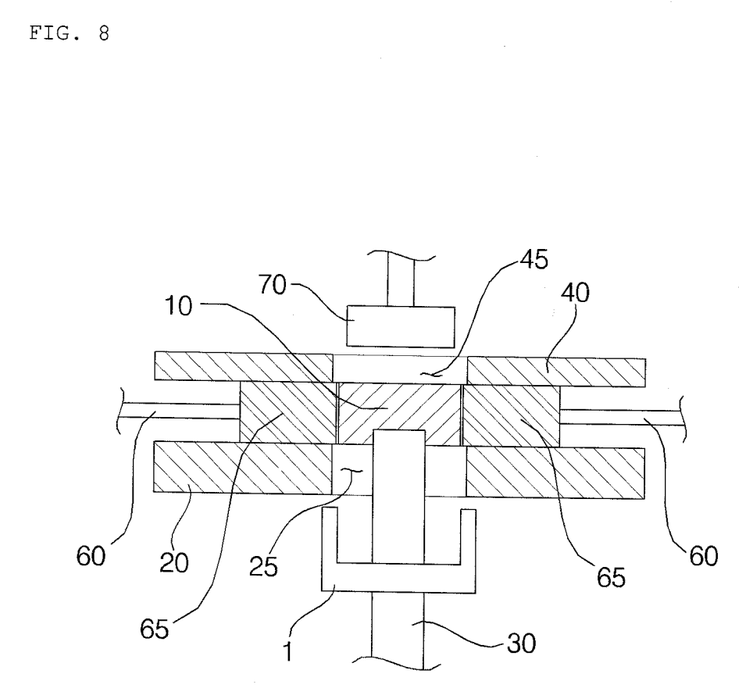
FIG. 8 is a side cross-sectional view showing when the airbag cushion shown in FIG. 6 is pressed and compressed by a second press jig of the apparatus for folding a driver airbag cushion according to an exemplary embodiment of the present invention.

FIG. 7 is a plan view showing when the airbag cushion shown in FIG. 6 is pressed and compressed by a second press jig of the apparatus for folding a driver airbag cushion according to an exemplary embodiment of the present invention and FIG. 8 is a side cross-sectional view showing when the airbag cushion shown in FIG. 6 is pressed and compressed by a second press jig of the apparatus for folding a driver airbag cushion according to an exemplary embodiment of the present invention.

Referring to FIGS. 7 and 8, after the airbag cushion 10 is circumferentially divided into several sections by the first blades 55, the second press jigs 60 operate and the second blades 65 are inserted into between the first plate 20 and the second plate 40 and press inward the edge of the airbag cushion 10 divided in the server sections by the first blades 55 such that the airbag cushion 10 is compressed, thereby finishing folding the airbag cushion 10.

The apparatus 100 for folding a driver airbag cushion according to the exemplary embodiment of the present invention can change the folded shape of the airbag cushion 10 by changing the shapes of the first blades 55 and the second blades 65 and changing the amount of movement of the first press jigs 50 and the second press jigs 60. That is, since the mounting plate 1 is formed a various shapes, such as a circle or a triangle, the internal space of the mounting plate 1 which receives the airbag cushion 10 is also formed in various shapes, such as a circle or a triangle. Therefore, when the first press jigs 50 and the second press jigs 60 have the same amount of movement, the airbag cushion 10, as shown in FIG. 7, is compressed in a circle and can be received in the mounting plate 1 that has a circular internal space, while the airbag cushion 10 may be compressed in a triangle and received in the mounting plate 1 that has a triangular internal space by changing the shapes of the first blades 55 and the second blades 65 and changing the amount of movement of the first press jigs 50 and the second press jigs 60.

As described above, as the airbag cushion 10 is folded to fit the shape of the internal space of the mounting plate 1, there is no empty space in the mounting plate 1 after the airbag cushion 10 is received in the internal space of the mounting plate 1, such that it is possible to improve inflation performance of the airbag cushion 10 and also improve the esthetic appearance of the steering wheel by preventing the mounting plate 1 from swelling up above the mounting plate 1 after receiving the airbag cushion 10.

Figure 9:
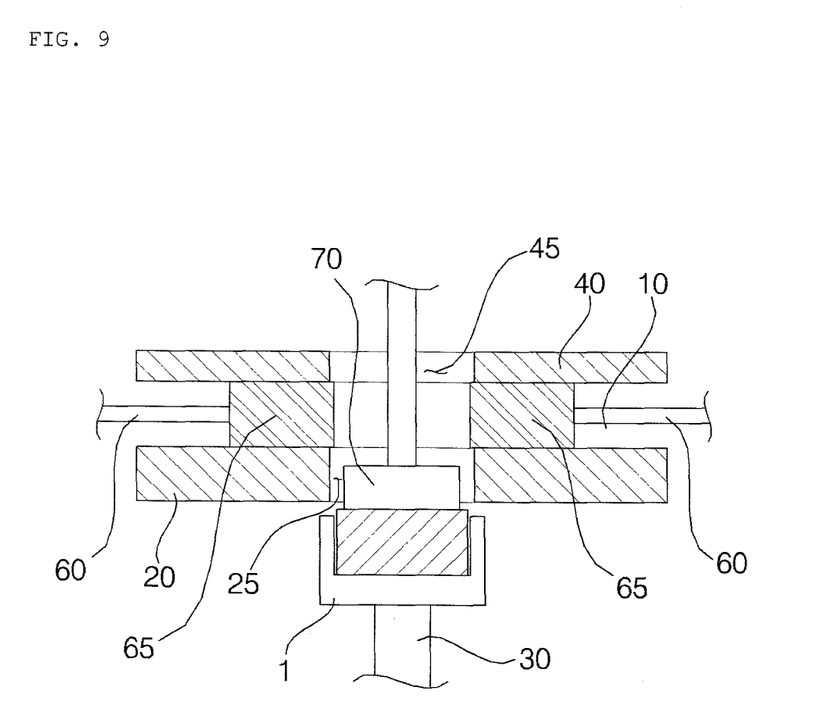
FIG. 9 is a view showing when the airbag cushion shown in FIG. 8 is received in a mounting plate by a pusher of the apparatus for folding a driver airbag cushion according to an exemplary embodiment of the present invention.

FIG. 9 is a view showing when the airbag cushion shown in FIG. 8 is received in a mounting plate by a pusher of the apparatus for folding a driver airbag cushion according to an exemplary embodiment of the present invention.

Referring to FIG. 9, the pusher 70 pushes the airbag cushion 10 through the pusher hole 45 while moving down, when the airbag cushion 10 has been compressed and completely folded by the second press jigs 60. Therefore, the airbag cushion 10 can be pushed down through the fixing jig hole 25 and then received in the mounting plate 1.

When the pusher 70 pushes the airbag cushion 10, the fixing jig 30 guides the airbag cushion 10 to be received in the mounting plate 1 while moving down with the airbag cushion 10.

The fixing jig 30 may be disposed to be movable up/down through the mounting plate 1 in order to guide the airbag cushion 10 into the mounting plate 1.

After the airbag cushion 10 is received in the mounting plate 1, the fixing pins 35 retract into the fixing jig 30 and the retainer 15 is unfixed, and then the fixing jig 30 moves down out of the mounting plate 1.

Figure 10:
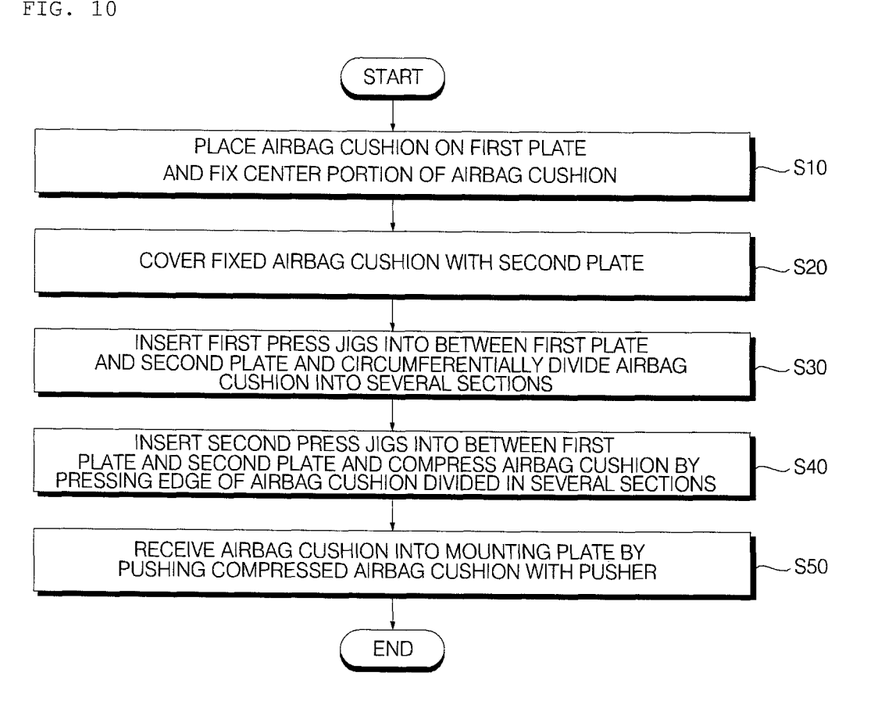
FIG. 10 is a flowchart illustrating a method of folding a driver airbag cushion according to an exemplary embodiment of the present invention.

FIG. 10 is a flowchart illustrating a method of folding a driver airbag cushion according to an exemplary embodiment of the present invention. Hereafter, a method of folding a driver airbag cushion according to an exemplary embodiment of the present invention is described in connection with the operation of the apparatus for folding a driver airbag cushion according to an exemplary embodiment of the present invention.

First, when the airbag cushion 10 is placed on the first plate 20 and the fixing jig 30 is inserted into the center portion of the airbag cushion 10, the fixing pins 35 protrude from the fixing jig 30 and fix the retainer 15, such that the center portion of the airbag cushion 10 is fixed (S10).

Subsequently, the second plate 40 moves down and covers the fixed airbag cushion 10 (S20).

Thereafter, the first press jigs 50 are inserted into between the first plate 20 and the second plate 40 and the first blades 55 press inward the edge of the airbag cushion 10, such that the airbag cushion 10 is circumferentially divided into several sections (S30).

Thereafter, the second press jigs 60 are inserted into between the first plate 20 and the second plate 40 and the second blades 65 press inward the edge of the airbag cushion 10 that has been divided into several sections by the first press jigs 50 and compress the airbag cushion 10, thereby finishing folding the airbag cushion 10 (S40).

Thereafter, when the pusher 70 moves down through the pusher hole 45 and pushes down the airbag cushion 10 that has been compressed by the second press jigs 60, the airbag cushion 10 is received in the mounting plate 1 after passing through the fixing jig hole 25 (S50).

As described above, in the airbag cushion 10 that has been folded by the apparatus for folding a driver airbag cushion and a method of folding a driver airbag cushion according to the exemplary embodiment of the present invention, since the edge of the airbag cushion 10 is pressed inward by the first press jigs 50 such that the airbag cushion 10 is circumferentially divided into several sections, and then the edge of the airbag cushion 10 that has been divided into several sections by the first press jigs 50 is pressed inward by the second press jigs 60 such that the airbag cushion 10 is compressed, the airbag cushion 10 is folded in the shape corresponding to the internal space of the mounting plate 1, such that the airbag cushion 10 can be received in the mounting plate 1 without an empty space.

Since the airbag cushion 10 that has been compressed and completely folded by the second press jigs 60 is pushed down into the mounting plate 1 by the pusher 70, the folding process and receiving process of the airbag cushion 10 are integrated, thereby simplifying the entire process.

It will be understood to those skilled in the art that the present invention may be implemented in various ways without changing the spirit of necessary features of the present invention. Accordingly, the exemplary embodiments described above are provided as examples in the whole respects and do not limit the present invention. The scope of the present invention is defined in the following claims and all changed or modified types derived from the meanings and scope of the claims and the equivalent concept thereof should be construed as being included in the scope of the present invention.

What is claimed is:

1. An apparatus for folding a driver airbag cushion, comprising:
 a first plate where an airbag cushion is placed to be folded;
 a fixing jig that fixes a retainer which is disposed at the airbag cushion on the first plate, wherein the retainer includes an inflator hole through which an inflator is inserted, and wherein the first plate includes a fixing jig hole through which one end portion of the fixing jig passes to fix the retainer;
 a second plate that covers the fixed airbag cushion;
 a plurality of first press jigs that is inserted between the first plate and the second plate and circumferentially divides the airbag cushion into several sections by pressing inward an edge of the airbag cushion;
 a plurality of second press jigs that is inserted between the first plate and the second plate and compresses the airbag cushion, which has been divided into several sections by the first press jigs, by pressing inward the edge of the airbag cushion;
 a mounting plate that is disposed under the first plate and receives the airbag cushion that has been compressed by the second press jigs through the fixing jig hole, wherein the fixing jig is disposed to be movable through the mounting plate to guide the airbag cushion into the mounting plate; and
 a pusher that pushes the airbag cushion that has been compressed by the second press jigs into the mounting plate through the fixing jig hole,
 wherein the fixing jig includes fixing pins protrudably installed in a radial direction of the inflator hole such that the fixing pins are protruded from the fixing jig to become in a close contact with corners of the retainer to fix the airbag cushion through the inflator hole, wherein the fixing pins are retractable into the fixing jig to be released from the retainer.

2. The apparatus of claim 1, wherein the first press jigs and the second press jigs are alternately arranged around the airbag cushion.

3. The apparatus of claim 1, wherein a first blade, of which the front end has a cross-sectional area that comes in surface contact with the edge of the airbag cushion and the rear end gradually opens and has a cross-sectional area of which the sides come in surface contact with the airbag cushion, is disposed at the first press jig to divide circumferentially the airbag cushion in several sections, and a second blade, of which the front end has a cross-sectional area that comes in surface contact with the edge of the airbag cushion, is disposed at the second press jig to compress the airbag cushion that has been divided in several sections by the first blades.

4. The apparatus of claim 1, wherein the second plate includes a pusher hole through which the pusher is inserted such that the pusher pushes the airbag cushion through the fixing jig hole.

5. A method for folding a driver airbag cushion, comprising:
- placing an airbag cushion on a first plate and fixing a retainer which is disposed at the airbag cushion by a fixing jig;
- covering the fixed airbag cushion with a second plate;
- inserting a plurality of first press jigs between the first plate and the second plate and circumferentially dividing the airbag cushion into several sections by pressing inward an edge of the airbag cushion;
- inserting a plurality of second press jigs between the first plate and the second plate and compressing the airbag cushion, which has been divided into several sections by the first press jigs, by pressing inward the edge of the airbag cushion; and
- receiving the airbag cushion into a mounting plate by pushing the airbag cushion that has been compressed by the second press jigs with a pusher, wherein the fixing jig moves downward through the mounting plate to guide the airbag cushion into the mounting plate, wherein fixing pins are formed on the fixing jig to be protruded in the radial direction of the inflator hole and to fix the retainer through the inflator hole, wherein the fixing pins are retractable into the fixing jig to be released from the retainer.

6. The method of claim 5, wherein a retainer having an inflator hole through which an inflator generating a gas is inserted is disposed at the center portion of the airbag cushion, and
- the airbag cushion is fixed by the fixing jig that is inserted into a fixing jig hole formed through the first plate and the inflator hole.

7. The method of claim 5, wherein the pusher inserted through a pusher hole formed through the second plate pushes the airbag cushion, which has been compressed, through a fixing jig hole formed through the first plate.

8. The method of claim 5, wherein as the pusher pushes the compressed airbag cushion, the airbag cushion is received in the mounting plate through a fixing jig hole formed through the first plate.

\* \* \* \* \*